US012559229B2

(12) United States Patent
Wilson

(10) Patent No.: US 12,559,229 B2
(45) Date of Patent: Feb. 24, 2026

(54) MOVEABLE WING TIP ACTUATION SYSTEM

(71) Applicant: AIRBUS OPERATIONS LIMITED, Bristol (GB)

(72) Inventor: Thomas Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/744,203

(22) Filed: Jun. 14, 2024

(65) Prior Publication Data

US 2024/0417061 A1      Dec. 19, 2024

(30) Foreign Application Priority Data

Jun. 16, 2023      (GB) ...................................... 2309071

(51) Int. Cl.
 *B64C 23/06* (2006.01)
 *B64C 3/54* (2006.01)
 *B64C 3/56* (2006.01)
(52) U.S. Cl.
 CPC ............ *B64C 23/072* (2017.05); *B64C 3/546* (2013.01); *B64C 3/56* (2013.01)
(58) Field of Classification Search
 CPC ......... B64C 3/56; B64C 13/34; B64C 23/072; B64C 3/42; B64C 3/385; B64C 13/50; B64C 23/00; B64C 3/38; B64C 3/546; B64C 13/16; B64C 23/065; Y02T 50/10
 See application file for complete search history.

(56) References Cited

U.S. PATENT DOCUMENTS

2020/0207461 A1      7/2020  Dussart et al.
2022/0266984 A1*     8/2022  Winkelmann .......... B64C 13/34

FOREIGN PATENT DOCUMENTS

CN      110 997 483 A       4/2020
CN      111645849 A         9/2020
EP      4071050 A1         10/2022
GB      2 584 668 A        12/2020
WO      2017118832 A1       7/2017
WO      2024105353 A1       5/2024

OTHER PUBLICATIONS

Extended European Search Report for Application No. EP 24178828. 0, eight pages, dated Nov. 14. 2024.
Search Report for GB Application No. 2309071.5 dated Nov. 22, 2023, 5 pages.

* cited by examiner

*Primary Examiner* — Valentina Xavier
(74) *Attorney, Agent, or Firm* — Nixon & Vanderhye, PC

(57) ABSTRACT
An aircraft wing is disclosed having a fixed wing with a tip, and a wing tip device rotatably mounted on a hinge at the tip of the fixed wing, such that the wing tip device is rotatable about the hinge, and an actuation system for rotating the wing tip device about the hinge. The actuation system includes a motor, at least one geared rotary actuator, a reduction gearbox, a clutch for selectively decoupling rotation of the motor from rotation of the geared rotary actuator, the geared rotary actuator is driveable by the motor and arranged to convert rotary motion into a different rotary motion and is arranged to rotate the wing tip device relative to the tip of the fixed wing. The clutch is coupled to the geared rotary actuator by a shaft and the shaft is fixed in rotation to a mass disposed radially outwardly from the shaft.

20 Claims, 16 Drawing Sheets

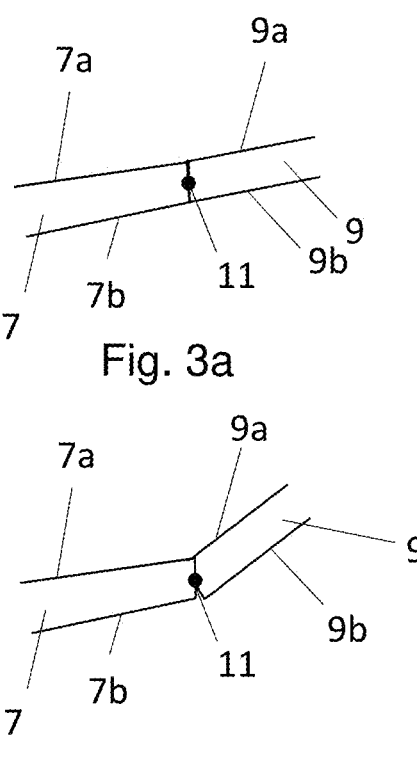
Fig. 3a
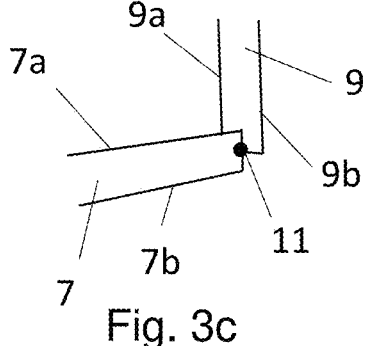
Fig. 3b
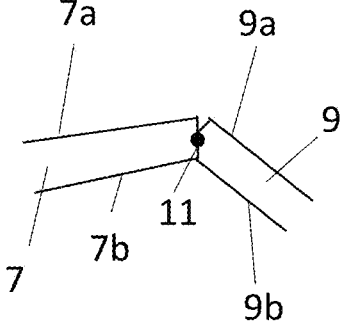
Fig. 3c
Fig. 3d

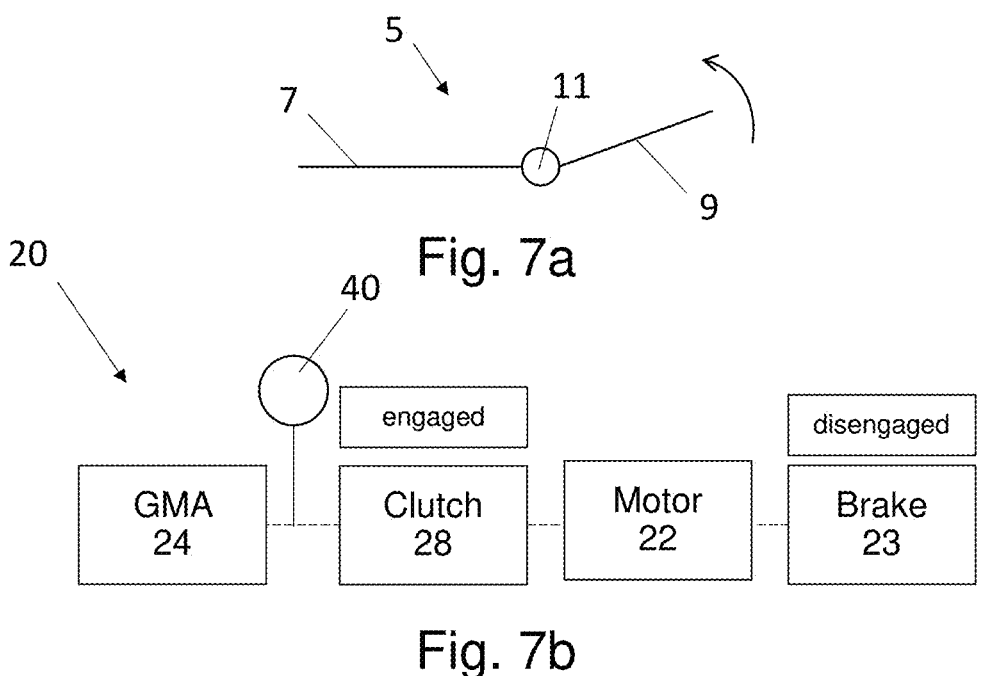
Fig. 7a
Fig. 7b
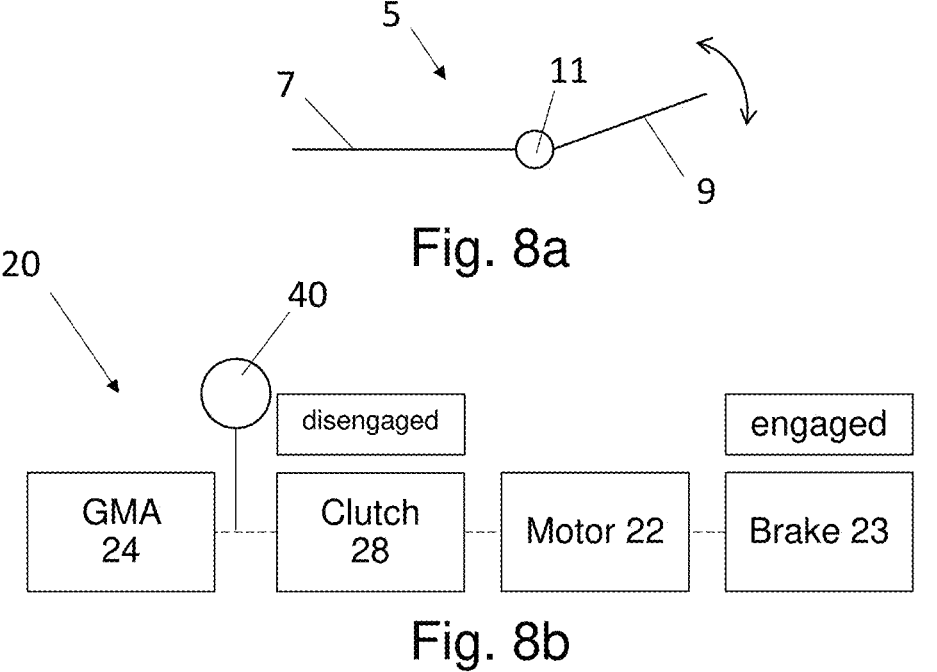
Fig. 8a
Fig. 8b

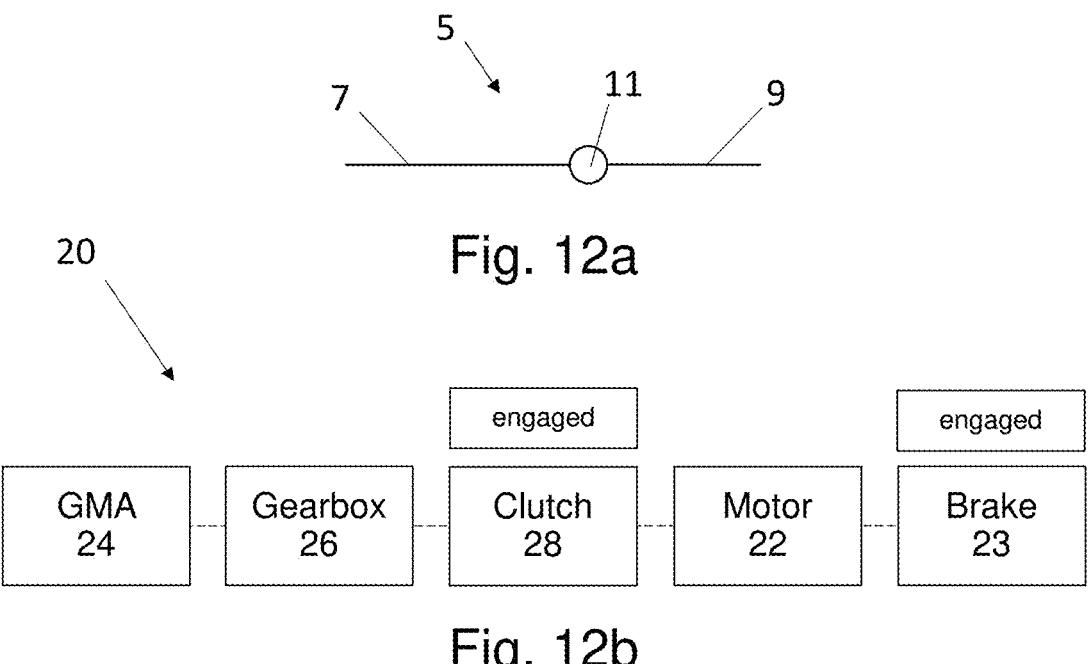
Fig. 12a
Fig. 12b
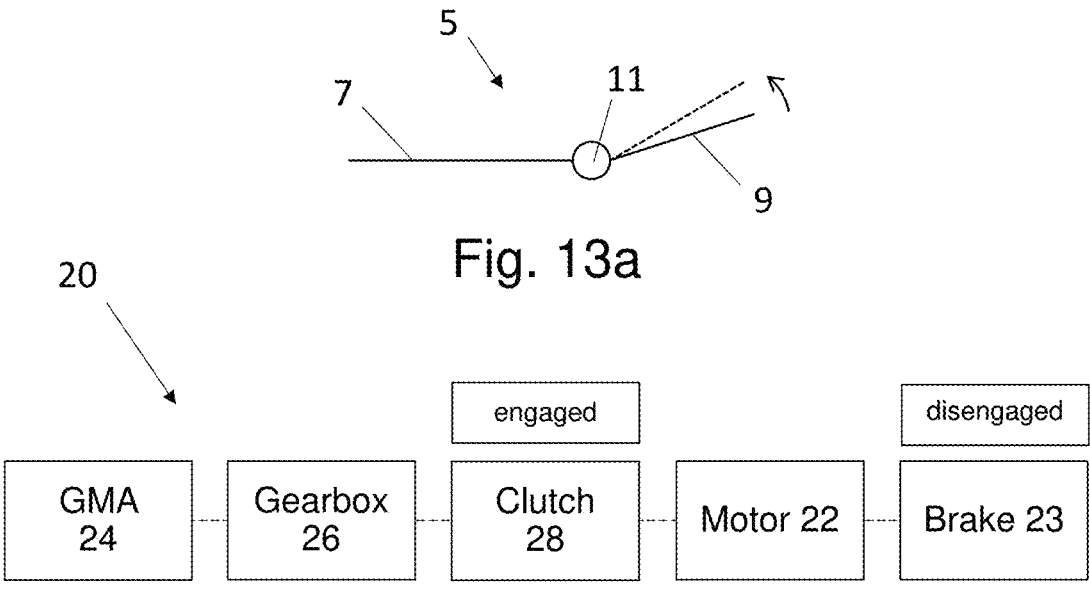
Fig. 13a
Fig. 13b

MOVEABLE WING TIP ACTUATION SYSTEM

CROSS RELATED APPLICATION

This application claims priority to United Kingdom Patent Application GB 2309071.5, filed Jun. 16, 2023, the entire contents of which is hereby incorporated by reference.

FIELD OF THE INVENTION

The present invention relates to an aircraft wing with a moveable wing tip device.

BACKGROUND OF THE INVENTION

Using a moveable wing tip device during flight is known, e.g. from WO2017118832. This document teaches an aircraft wing having a fixed wing with a wing tip device moveably mounted at the tip thereof, wherein the fixed wing has an upper surface and a lower surface, and the wing tip device has an upper surface and a lower surface, and the wing tip device is operable between: (i) a flight configuration for use during flight, in which configuration the upper and lower surfaces of the wing tip device are continuations of the upper and lower surfaces of the fixed wing; and (ii) a load alleviating configuration for load alleviation during flight, in which configuration the wing tip device is moved relative to the fixed wing such that at least one of the upper and lower surfaces of the wing tip device is moved away from the respective surface of the fixed wing, and the load on the wing is reduced; wherein the aircraft comprises a restraining assembly operable between a restraining mode in which the wing tip device is held in the flight configuration using a restraining force, and a releasing mode in which the restraining force on the wing tip device is released, such that the wing tip device is able to adopt the load alleviating configuration.

The wing tip device may be entirely passively actuated to the load-alleviating configuration once the restraining assembly is in releasing mode. It may be moved under the action of aerodynamic forces urging the wing tip device towards the load-alleviating configuration. Having the restraining assembly in combination with this hinged wing tip device may be referred to as a "semi-aeroelastic" arrangement.

The wing tip device may be rotatably mounted on a hinge at the tip of the wing, such that it may rotate, about the hinge, between the flight and load alleviating configurations. The wing tip device may also be moveable about the same hinge to a ground configuration for use during ground-based operations, in which ground configuration the wing tip device is moved away from the flight configuration such that the span of the aircraft wing is reduced.

An actuation system may be arranged to move the wing tip device between the flight configuration and the ground configuration. The actuation system may also be arranged to move the wing tip device from the load alleviating configuration back to the flight configuration.

It has been found that when in the load alleviating condition, movement of the wing tip device may need to be tuned.

SUMMARY OF THE INVENTION

A first aspect of the invention provides an aircraft wing comprises a fixed wing with a tip, and a wing tip device rotatably mounted on a hinge at the tip of the fixed wing, such that the wing tip device is rotatable about the hinge, and an actuation system for rotating the wing tip device about the hinge, wherein the actuation system comprises a motor, at least one geared rotary actuator, a reduction gearbox, a clutch for selectively decoupling rotation of the motor from rotation of the geared rotary actuator, the geared rotary actuator is driveable by the motor and arranged to convert rotary motion into a different rotary motion and is arranged to rotate the wing tip device relative to the tip of the fixed wing, wherein the clutch is coupled to the geared rotary actuator by a shaft and the shaft is fixed in rotation to a mass disposed radially outwardly from the shaft.

With this arrangement, the rotational inertia of the wing tip device is increased when it rotates relative to the fixed wing. This increase in rotational inertia of the wing tip device reduces the wing tip flapping frequency and thus increases flutter speed. The addition of a mass that rotates with the shaft minimises the additional weight that is required to reduce the gradient at which the frequency of flapping of the wing tip device increases with aircraft speed compared to alternative solutions such as adding weight to the wing tip device itself because the shaft motion is geared with respect to motion of the wing tip device and the inertia of the mass coupled to the shaft is squared with the gear ratio of the reduction gearbox.

The hinge may have a hinge line and the shaft may have a shaft axis of rotation which is coaxial with the hinge line.

The geared rotary actuator may be arranged along a hinge line of the hinge and has an outer diameter. The shaft may have a shaft diameter significantly less than the outer diameter of the geared rotary actuator, and the mass may have an outer diameter about the shaft axis which is substantially the same as the outer diameter of the geared rotary actuator.

The mass may rotate as the wing tip device rotates about the hinge.

The mass may rotate at an angular velocity faster than the wing tip device rotation about the hinge due to the gearing of the geared rotary actuator.

The mass may be an annulus or a wheel or a ring.

The shaft may extend through a hole in the mass.

The mass may comprise Tungsten.

The mass may be less than approximately 20% of a mass of the wing tip device, preferably less than 15%.

The mass may be less than approximately 10% of a mass of the combined wing tip device and actuation system, preferably less than 7%.

The mass may increase the rotational inertia of the wing tip device about the hinge by at least 20% compared to the same aircraft wing without the mass, preferably by at least 30% or at least 40% or at least 50%.

An aircraft wing may further comprise a plurality of the geared rotary actuators arranged along a hinge line of the hinge.

The mass may be disposed between the geared rotary actuators and the clutch.

The mass may be disposed forward of the geared rotary actuator(s) towards a leading edge of the wing.

The mass may be disposed between a pair of the geared rotary actuators.

The actuation system may have a maximum damping value which allows oscillating flapping movement of the wing tip device rotating about the hinge during normal operation when the clutch is disengaged.

The actuation system may be back driveable when the clutch is disengaged to decouple rotation of the motor from rotation of the geared rotary actuator as the wing tip device rotates about the hinge.

The actuation system may further comprise a reduction gearbox.

The reduction gearbox may be disposed between the clutch and the geared rotary actuator along a drive train between the motor and the geared rotary actuator.

The actuation system may further comprise a brake for preventing motion of the geared rotary actuator when the clutch is engaged.

The actuation system may be operable in i) a driving mode in which the clutch is engaged and the motor is driven to rotate the wing tip device about the hinge; ii) a flapping mode in which the clutch is disengaged and the wing tip device is rotatable about the hinge by forces external to the wing tip device; and iii) a braked mode in which the clutch is engaged and the brake prevents rotation of the wing tip device about the hinge.

The geared rotary actuator may have a first knuckle fixed to the fixed wing, and a second knuckle fixed to the wing tip device, wherein the first knuckle and the second knuckle are driven to rotate with respect to each other by the geared rotary actuator using motive force provided by the motor.

The clutch may be configured to be disengaged during flight for one of more of a) loads alleviation, or b) when the aircraft is flying at relatively low speed or altitude and a relatively high roll rate is required.

A further aspect of the invention provides a method of tuning an aircraft wing, wherein the aircraft wing is in accordance with the first aspect, and the method comprises tailoring the mass to vary the inertia and therefore the frequency at which the wing tip device oscillates about the hinge when the clutch is disengaged during flight.

BRIEF DESCRIPTION OF THE DRAWINGS

Embodiments of the invention will now be described with reference to the accompanying drawings, in which:

FIGS. 3a, 3b, 3c and 3d show the wing tip device of FIG. 2 in detail;

FIG. 4c shows a detailed view of a section of the actuation system of FIG. 4a;

FIG. 7a shows schematically a wing tip device operating in a driving mode of operation;

FIG. 7b shows a representation of an actuation system configured to operate in a driving mode;

FIG. 8a shows schematically a wing tip device operating in a flapping mode of operation;

FIG. 8b shows a representation of an actuation system configured to operate in a flapping mode;

FIG. 12a shows schematically a wing tip device operating in a braked mode of operation;

FIG. 12b shows a representation of an actuation system configured to operate in a braked mode;

FIG. 13a shows schematically a wing tip device operating in a fixed mode of operation;

FIG. 13b shows a representation of an actuation system configured to operate in a fixed mode;

DETAILED DESCRIPTION OF
EMBODIMENT(S)

Figure 1:
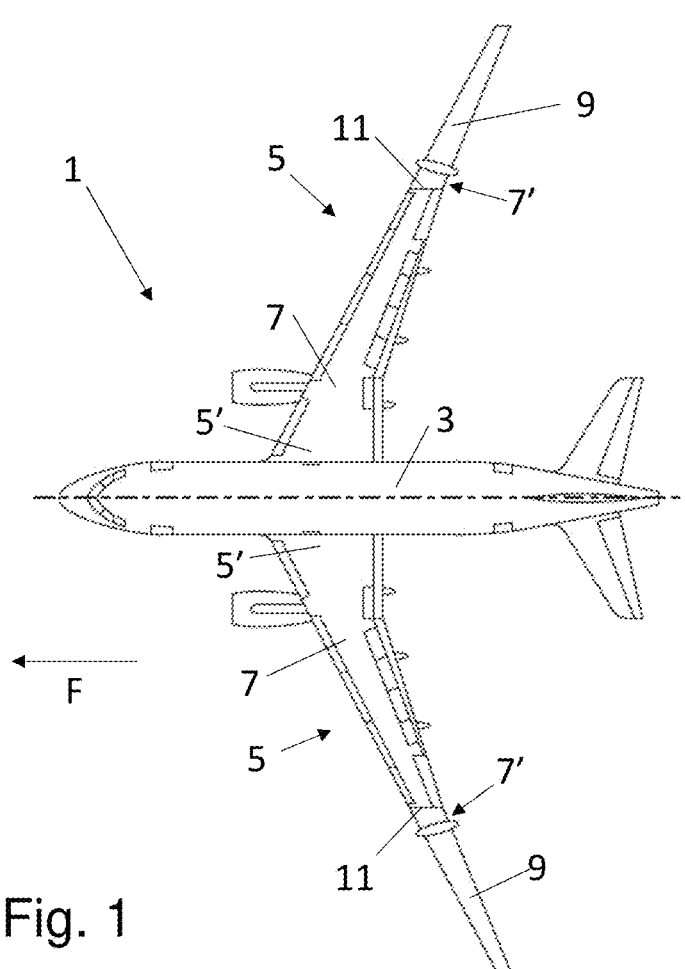
FIG. 1 shows a plan view of an aircraft with a wing and a folding wing tip device.

FIG. 1 is a plan view of an aircraft 1. The aircraft comprises a central fuselage 3 and two main wings 5 extending outwardly from respective wing roots 5'.

Each wing 5 comprises a fixed wing 7 extending from the root 5' to the tip 7'. At the tip 7' of the fixed wing 7, the wing 5 also comprises a moveable wing tip device 9, in the form of a planar wing tip extension. The wing tip device 9 is rotatably mounted about a hinge 11. This hinge 11, may be oriented non-parallel (or 'flared') to the line of flight direction F. The hinge 11 may alternatively be parallel to the line of flight direction F.

In a fixed flight configuration, the wing tip device 9 is fixed with respect to the fixed wing 7. The wing tip device 9 may be an extension of the fixed wing. Accordingly, the upper surface 7a and lower surface 7b of the fixed wing 7 may be continuous with the upper surface 9a and lower surface 9b of the wing tip device 9 (see FIG. 3a and the second from lowermost position in FIG. 2). The leading and trailing edges of the fixed wing 7 may also be continuous with the respective leading and trailing edges of the wing tip device 9. Such an arrangement is beneficial as it provides a relatively large wing span, thereby providing an aerodynamically efficient aircraft.

However, a large span can result in correspondingly large loads on the wing 5, particularly a large wing root bending moment, and especially during high load events such as gusts or extreme maneuvers. This large wing root bending moment for a relatively large span wing can be an issue. The wing 5 must be arranged to cope with these maximum loads, which can result in a relatively heavy wing, which may be prohibitive.

The ability of the wing tip device 9 to move substantially freely in a moving flight configuration (see FIGS. 2, 3b and 3d) seeks to address that problem. In this configuration, the wing tip device 9 is substantially freely rotatable about the hinge 11 with passive damping as will be described further below.

Figure 2:
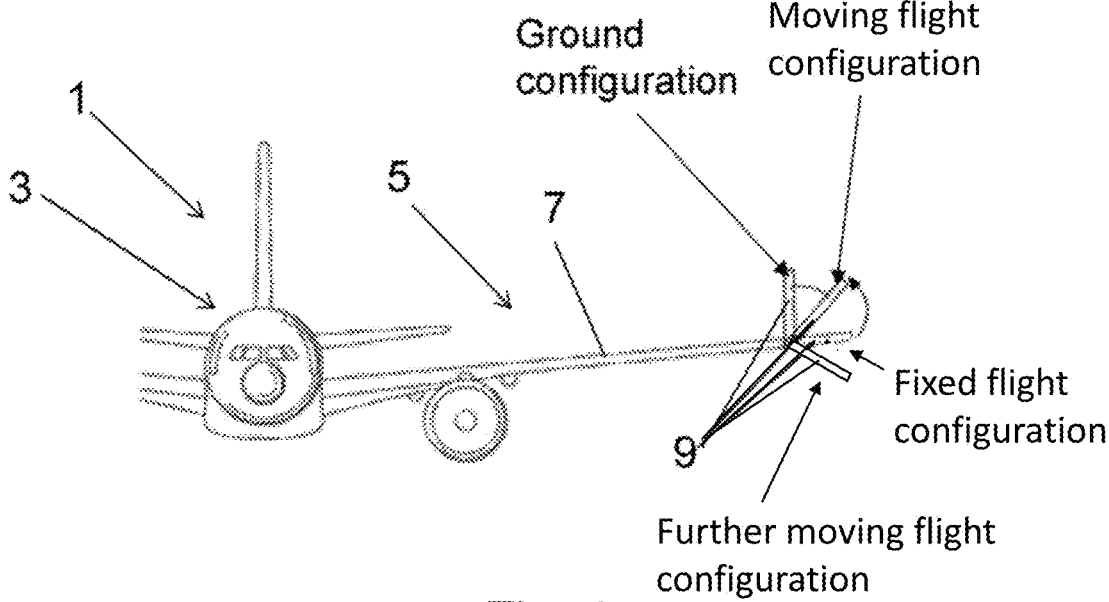
FIG. 2 shows a front view of the aircraft of FIG. 1 with the wing tip device in various configurations.

As shown in FIG. 3b and the second from uppermost position in FIG. 2, the wing tip device 9 is rotatable, upwards, such that the lower surfaces between the fixed wing 7 and the wing tip device 9 are no longer continuous with one another. Furthermore, if the hinge 11 is angled with respect to the streamwise direction (i.e. opposite and parallel to the line of flight direction F) when the wing tip device 9 rotates upwardly, the mean incidence of the wing tip device 9 is reduced.

As shown in FIG. 3d and the lowermost position in FIG. 2, the wing tip device 9 is also rotatable downwards, such that the upper faces between the fixed wing 7 and the wing tip device 9 are no longer continuous with one another.

In the moving flight configuration and the further moving flight configuration, the loads on the wing 5, generated by the wing tip device 9, are significantly reduced. The wing tip device 9 may be released to either of these configurations during flight (described in more detail below). By providing this load alleviation function during flight, the maximum load the wing needs to be designed for may be reduced, and thus the wing 5 can be made relatively lightweight.

The wing tip device 9 is also configurable to a ground configuration in which the wing tip device 9 is rotated yet further, to a substantially upright position (shown in FIG. 2d and the upright position in FIG. 2a). The wing tip device is moveable to this configuration when it is on the ground (described in more detail below). Once rotated to such a position, the span of the aircraft 1 is reduced. Thus, the aircraft 1 can have a large span (exceeding airport gate compatibility limits) during flight, but is still able to comply with gate limits when on the ground.

As shown in FIG. 3d, the hinge 11 allows both upward and downward rotation of the wing tip device 9 in the moving flight configuration. Such an arrangement enables both positive-g and negative-g loads to be alleviated.

Figures 4A, 4B:
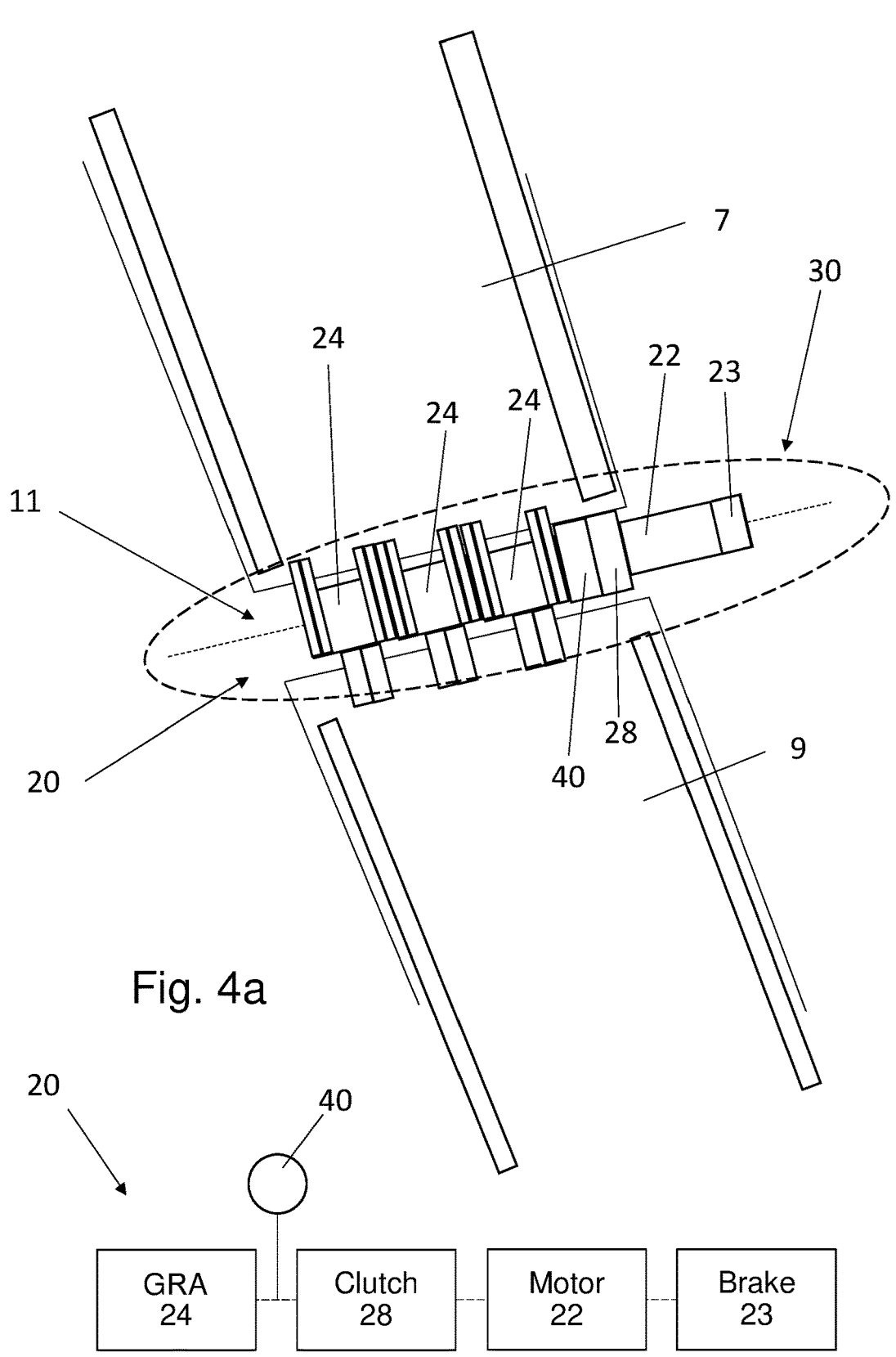
FIG. 4a shows schematically an actuation system for moving the wing tip device in accordance with the invention.
FIG. 4b shows the actuation system of FIG. 4a more generally in block diagram form.

FIGS. 4a and 4b show an example of an actuation system 20 for rotating the wing tip device 9 about the hinge 11. The actuation system 20 comprises a motor 22, at least one geared rotary actuator (GRA) 24, and a clutch 28. Where the actuation system 20 comprises a plurality of geared rotary actuators 24, the geared rotary actuators 24 are arranged along the hinge line of the hinge 11. The motor 22 may form part of a power drive unit (PDU) incorporating a brake, or a separate brake 23 may be provided as illustrated in FIGS. 4a and 4b. The geared rotary actuator 24 is a rotary actuator arranged to convert a first rotary motion into a different second rotary motion, e.g. at a different rate of angular rotation and/or torque and/or direction.

In the illustrated example, there are three geared rotary actuator (GRA) 'slices' 24 arranged along the hinge line of the hinge 11. The three GRAs may be driven off a common shaft 26a coupled to the motor 22. The shaft 26a may have a shaft axis of rotation coaxial with the hinge line. The motor 22 (or PDU) is arranged at one end of the three GRA slices. The GRAs 24 are each arranged on the hinge line of the hinge 11.

Figure 4C:
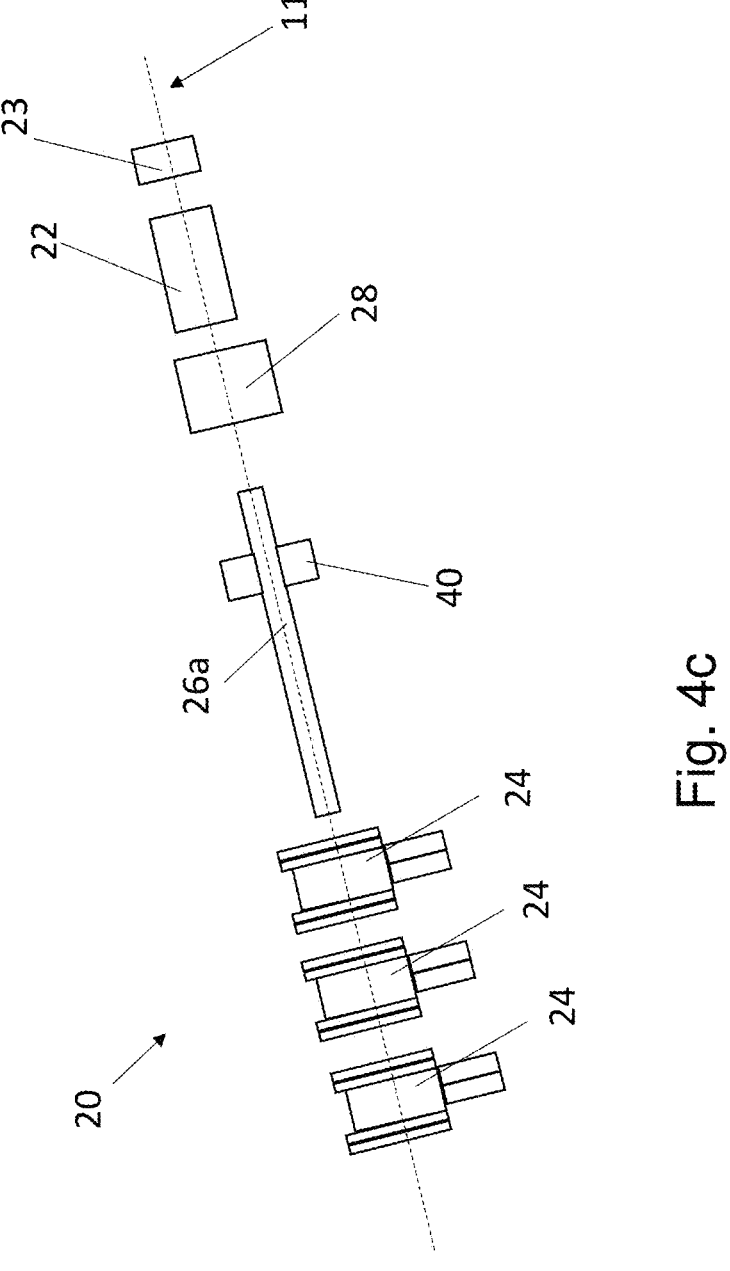

A fairing 30 is shown in FIG. 4a in dashed line. The fairing 30 is sized to accommodate the actuation system 20. The clutch 28 may have the same outer diameter as each of the GRAs 24 as illustrated in FIG. 4c such that the frontal surface area of the actuation system 20, and hence fairing 30, is minimized. The shaft 26a has a diameter significantly less than the diameter of the GRAs, for example less than half the diameter.

Figure 5:
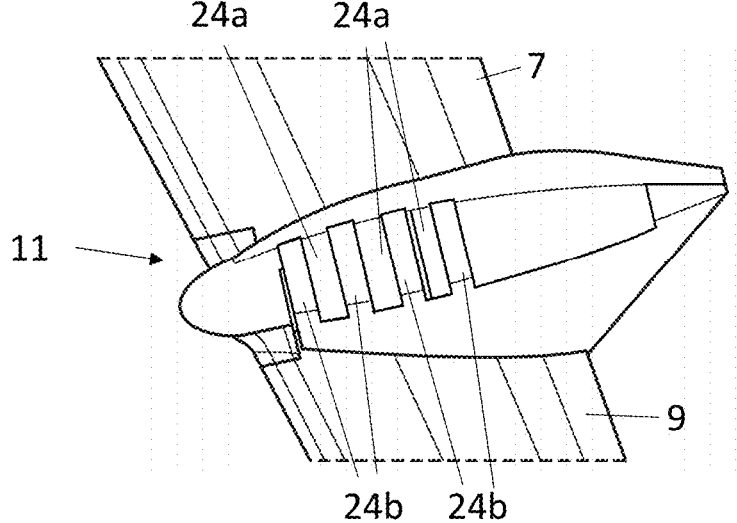
FIG. 5 shows a mechanical actuator according to the invention.

The GRAs 24 each have a first knuckle 24a (or pair of first knuckles) coupled to the fixed wing 7 and a second knuckle 24b (or pair of second knuckles) coupled to the wing tip device 9, such as shown in FIG. 5. Each of the GRAs 24 is substantially identical and comprises an internal gearing to apply a gear ratio to torque applied to the GRA via the common shaft 26a. When the motor 22 is activated to drive the common drive shaft 26a via the gearbox 26, the second knuckles 24b rotate relative to the first knuckles 24a of the GRAs 24. This drives the articulation of the wing tip device 9 relative to the fixed wing 7 about the hinge 11. The rotation may be a positive or negative rotation.

Figure 6A:
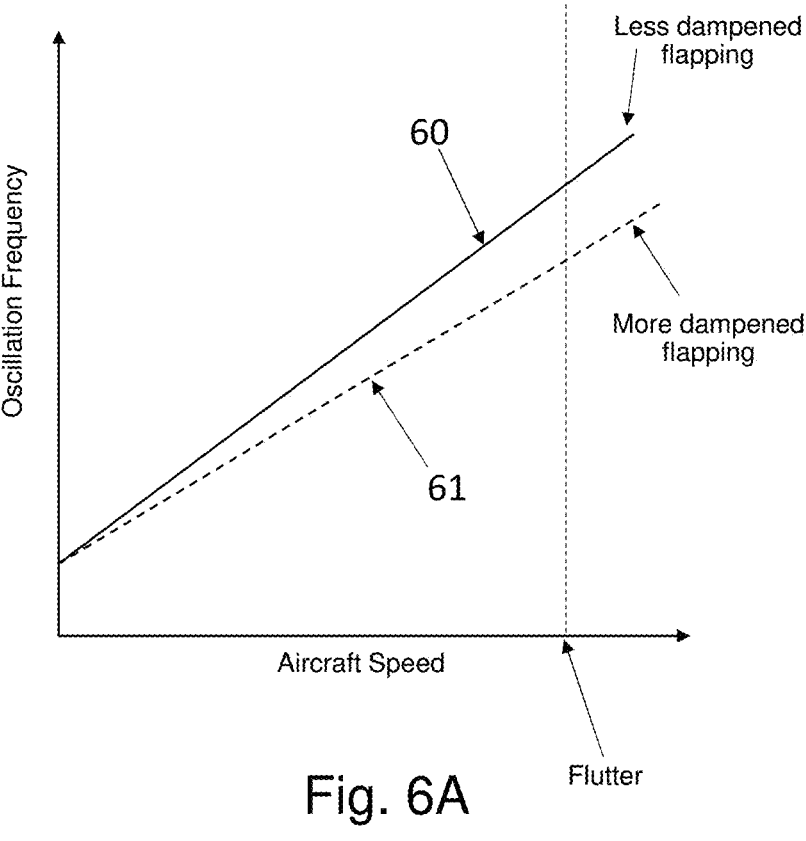
FIG. 6a shows a graph indicating the increase in flutter speed due to the addition of the mass to the actuation system.
Figure 6B:
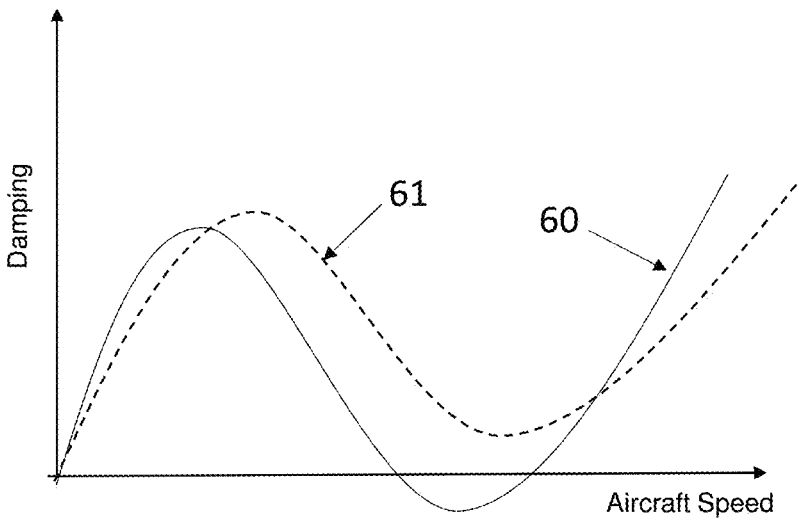
FIG. 6b shows a graph indicating the change in flap-bend mode coupling due to the addition of the mass to the actuation system.

To increase the effective rotational inertia of the wing tip device 9 so as to reduce the wing tip flapping frequency and thus increase flutter speed, a mass 40 may be fixed in rotation to the shaft 26a and disposed radially outwardly from the shaft 26a (See FIGS. 4a to 4c). The mass 40 may be an annulus, wheel, ring, or any other suitable configuration. In this manner, the shaft 26a can extend through a hole in the mass 40, although the mass may alternatively be positioned between two sections of a split shaft (not shown)—either integrally formed or separately formed. The addition of the mass 40 to the actuation system 20, and in particular to the rotatable shaft 26a, minimises the additional weight that is required to reduce the gradient at which the frequency of flapping of the wing tip device 9 increases with aircraft speed compared to alternative solutions such as adding weight to the wing tip device 9. This is shown in FIG. 6a, in which addition of the mass 40 to the actuation system 20 provides increased rotational inertia that acts decrease the wing tip flapping frequency (dotted line 61 indicates the actuation system 20 with a mass 40) relative to a wing 5 without the mass (solid line 60 indicates the actuation system 20 without a mass). FIG. 6b shows the effect of the mass 40 on flap-bend mode coupling, in which the local minima of damping is shifted to a slightly higher airspeed than the example without the mass 40, whilst the damping around this local minima is also increased. By delaying the frequency coalescence there is more aero damping available to help ensure stability.

In this manner, as the shaft 26a is rotated, the mass 40 rotates in accordance to develop rotational inertia that dampens the movement of the wing tip device 9.

As the GRA's comprise reduction gearing, the angular velocity of the wing tip device 9 is less than the angular velocity of the shaft 26a. Consequently, fixing the mass 40 to the shaft 26a, rather than directly to the wing tip device 9, achieves a comparatively higher rotational inertia as the inertia of the mass 40 increases as the square of the gear ratio between the motion of the wing tip device 9 and the motion of the shaft 26a with which the mass 40 rotates.

It will be appreciated that the rotational inertia developed by the mass 40 will be dependent on several factors, including its mass and diameter. A high-density material is typically favored due to the increased rotational inertia that is developed compared to a similarly sized mass 40 having a lower density. The mass 40 may comprise tungsten, or a similarly dense material having a density of greater than 10,000 kg/m³, and more preferably greater than 15,000 kg/m³. The mass 40 may have a density greater than the density of the components of the actuation system 20, such as the clutch 28, gearbox 26 and geared rotary actuators 24.

Due to the rotation of the mass 40, the inertia developed is greater than that otherwise developed by adding the mass to the wing tip device 9. For instance, the mass 40 may be less than approximately 20% of the mass of the wing tip device 9, or less than approximately 15%, and less than approximately 10% of the mass of the combined wing tip device 9 and actuation system 20, or less than 7%, whilst increasing the rotational inertia of the wing tip device 9 about the hinge 11 by 20% or more, 30% or more, 40% or more, or even 50% or more, than would be achieved by the same aircraft wing 5 without the mass 40.

It will be appreciated that the properties of the mass 40, such as its size and weight, can be varied to tailor the mass 40 to in turn vary the rotational inertia produced by the mass 40. For instance, a mass 40 may be selected for assembly into an actuation system 20 dependent on the flight handling requirements of the aircraft 1.

In this manner, the frequency at which the wing tip device 9 oscillates about the hinge 11 when the clutch 28 is disengaged during flight can be tailored. For instance, the mass 40 may be tailored to select a frequency of the wing tip device 9 oscillation about the hinge 11 that does not intersect with a natural frequency of the wing tip device 9 at an airspeed above a maximum design speed of the wing 5, or alternatively does intersect with a natural frequency of the wing tip device 9 at an airspeed above a maximum design speed of the wing 5, so as to avoid flutter.

To ensure the mass 40 develops rotational inertia when the clutch 28 is disengaged (e.g. during the flapping mode), the mass 40 may be disposed on an opposite side of the clutch 28 to the motor 22. It will be appreciated that reference to the "side" refers to the relative positions along the driveline rather than necessarily their physical position on the wing 5.

Engaging the clutch 28 enables the motor 22 to drive the GRAs 24 in a driving mode to rotate the wing tip device 9 about the hinge 11. An example of the actuation system 20 operating in a driving mode is illustrated by FIG. 7a, the curved arrow indicating the direction (e.g. anticlockwise when looking aft) in which the motor 22 rotates the wing tip device 9. It is noted that the motor 22 may alternatively rotate the wing tip device 9 in an opposite (e.g. clockwise) direction about the hinge 11. FIG. 7b illustrates how the clutch 28 and brake 23 are configured to allow the motor 22 to drive the wing tip device 9.

Disengaging the clutch 28 enables the GRAs 24 to substantially freely rotate, thereby allowing substantially free rotation (with passive damping due to the mechanical resistance of the actuation system) of the wing tip device 9 relative to the fixed wing 7 about the hinge 11 when in a flapping mode of operation. The wing tip device 9 may be entirely passively actuated in the flapping mode once the brake 23 and clutch 28 are released. For example, the wing tip device 9 may be moved under the action of aerodynamic forces and/or gravity. The option to brake or release the wing tip device 9 may be referred to as a "semi-aeroelastic" arrangement. A schematic representation of the actuation system 20 operating in a flapping mode is illustrated by FIG. 8a, the curved arrow indicating allowable rotation of the wing tip device 9. FIG. 8b illustrates how the clutch 28 and brake 23 are configured to allow the wing tip device 9 to freely rotate about the hinge 11.

Figures 9A, 9B:
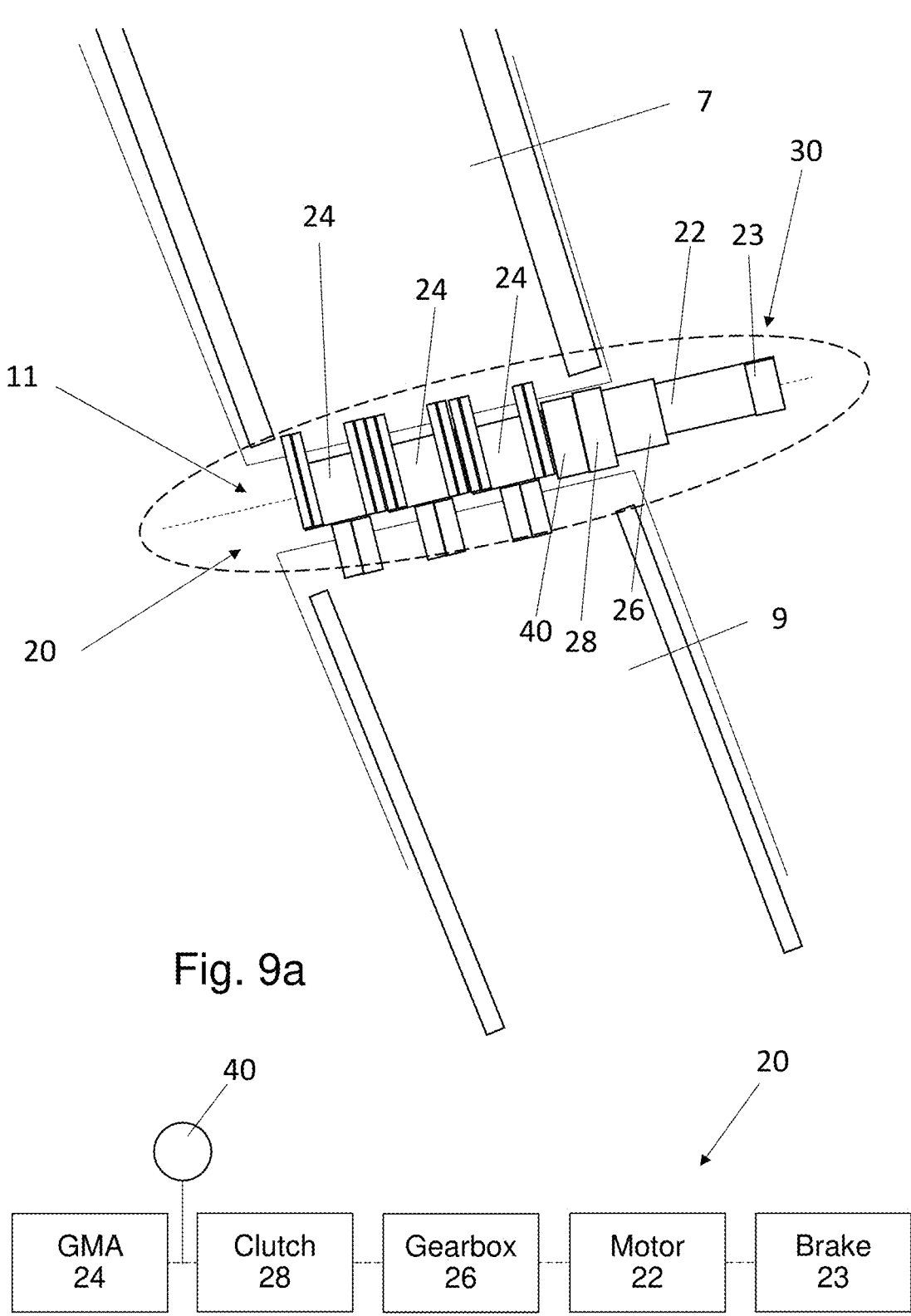
FIG. 9a shows schematically a second example of an actuation system for moving the wing tip device in accordance with the invention.
FIG. 9b shows the actuation system of FIG. 9a more generally in block diagram form.

An increase in the gear ratio between the GRAs 24 and the motor 22 can be provided by the addition of a gearbox 26, such as shown in FIGS. 9a and 9b. In this example, a gearbox 26 is provided between the clutch 28 and the motor 22.

Figures 10A, 10B:
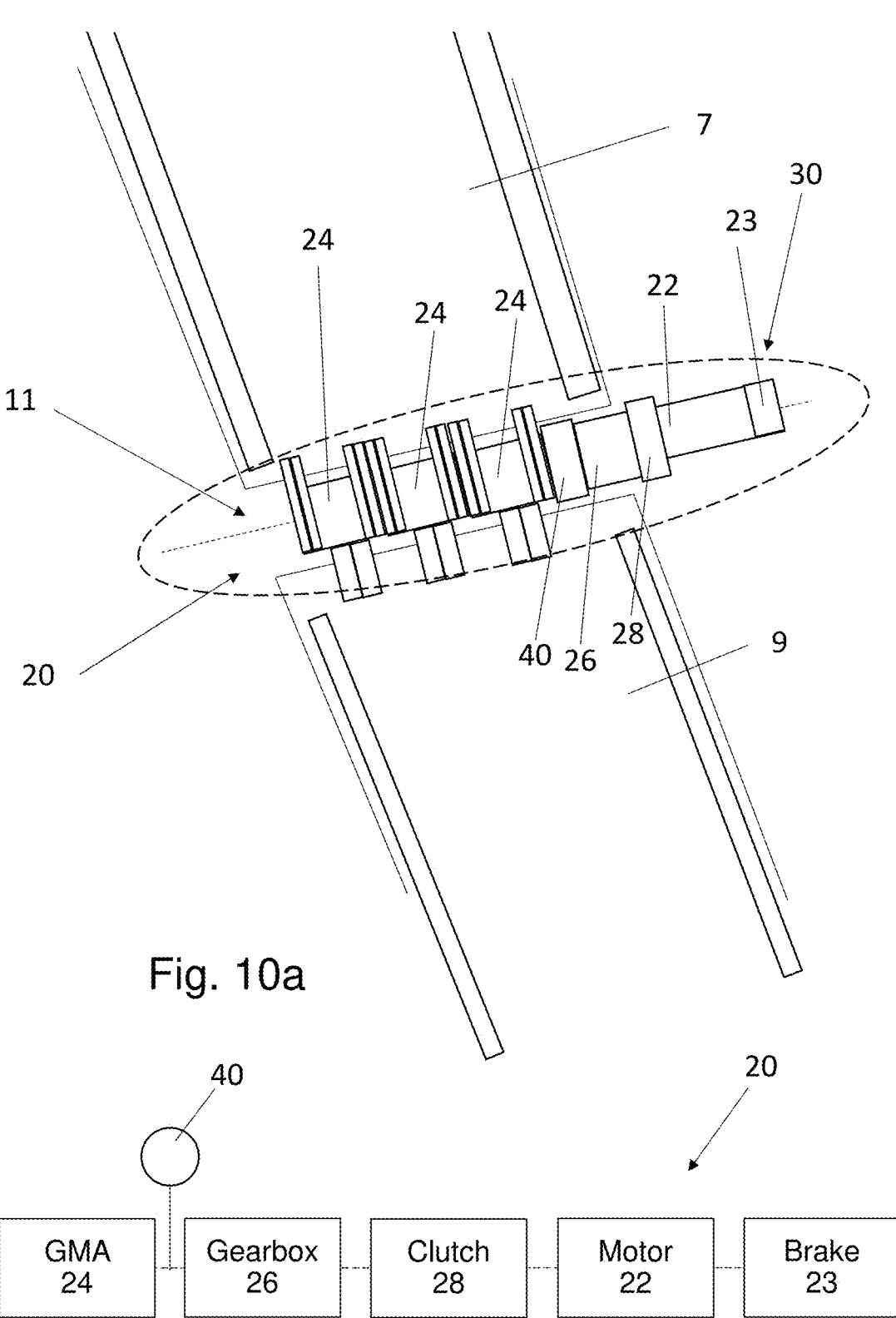
FIG. 10a shows schematically a third example of an actuation system for moving the wing tip device in accordance with the invention.
FIG. 10b shows the actuation system of FIG. 10a more generally in block diagram form.

Alternatively, the gearbox 26 may be provided between the GRAs 24 and the clutch 28, such as shown in FIGS. 10a and 10b. An advantage of this arrangement is that the clutch 28 may be designed to handle lower torque, as it is arranged before the gear ratio is applied to the torque from the motor 22 to the gearbox 26. This may reduce the size, weight, cost and complexity of the clutch 28.

Figures 11A, 11B:
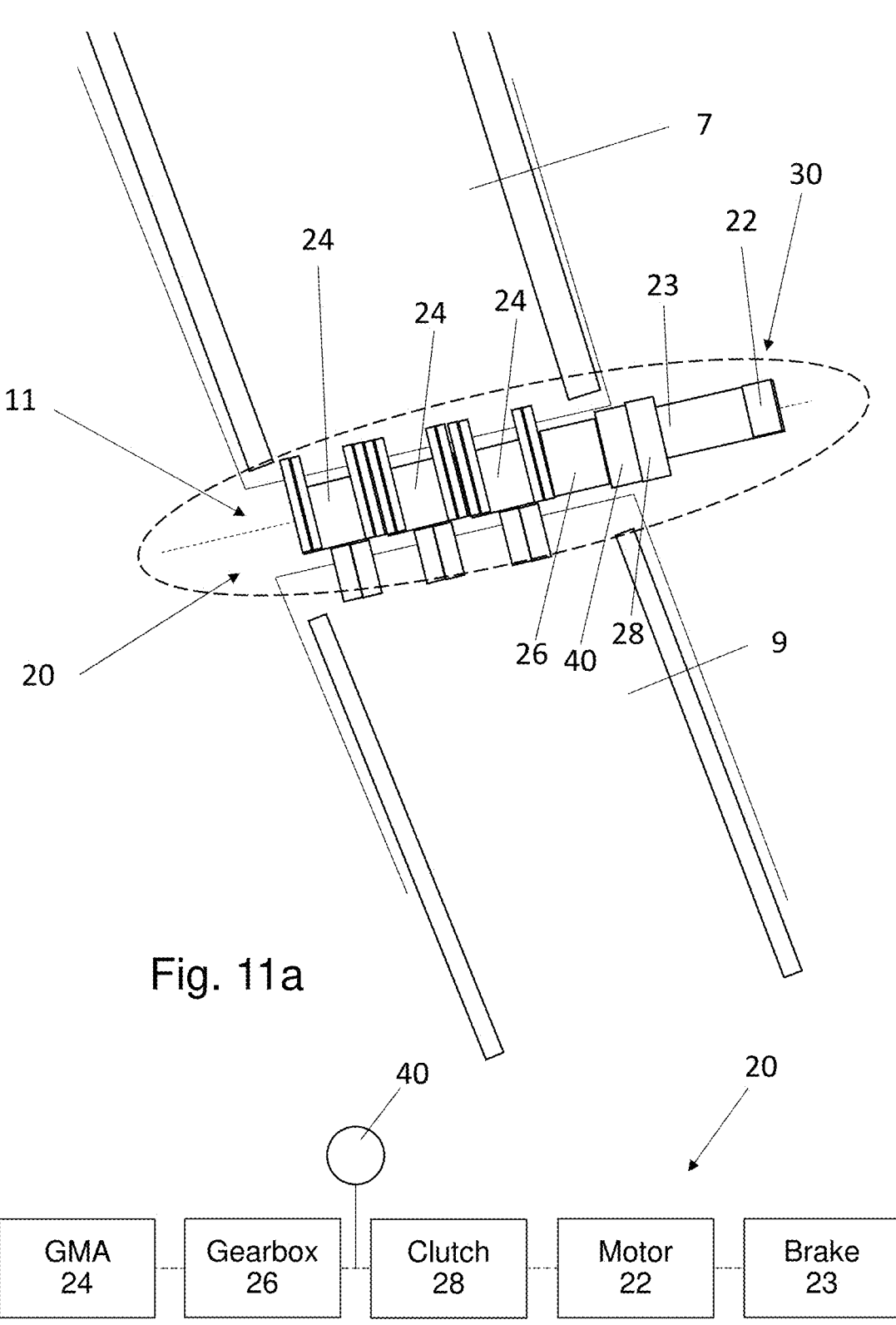
FIG. 11a shows schematically a fourth example of an actuation system for moving the wing tip device in accordance with the invention.
FIG. 11b shows the actuation system of FIG. 11a more generally in block diagram form.

In the examples of FIGS. 9 and 10, it will be noted that the mass 40 is disposed between the GRAs 24 and the gearbox 26. Alternatively, the mass 40 may be disposed between the clutch 28 and the gearbox 26 in order to take advantage of the gear ratio of the gearbox 26, i.e. the mass 40 is positioned upstream of the gearbox 26 towards the motor 22 due to the increased rotational speed of the shaft 26a at this point compared to downstream of the gearbox 26 towards the GRAs 24. An example of this arrangement is shown in FIGS. 11a and 11b.

When the clutch 28 is disengaged, the gearbox 26 may be back driveable such that the gearbox 26 is operable by movement of the wing tip device 9 rotating about the hinge 11.

The clutch 28 may be disengaged during flight for a number of further reasons. Allowing the wing tip device 9 to rotate substantially freely may be used to alleviate loads acting on the wing 5 as a result of external forces. As such, the maximum load the wing 5 needs to be designed for may be reduced, and thus the wing 5 can be made comparatively lightweight. Alternatively, the wing tip device 9 may be allowed to freely rotate such that span of the wing 5 is effectively reduced. Reducing the span of the wing 5 may be beneficial for example during relatively low speed or altitude flying where high levels of lift are not required, or when a relatively high roll rate is required.

When the brake 23 (optionally of the PDU) is engaged and the clutch 28 is also engaged, the actuation system 20 operates in a braked mode in which the brake 23 acts to prevent rotation of the wing tip device 9 relative to the fixed wing 7 about the hinge 11. The braked mode of operation may correspond to a zero or non-zero angular position of the wing tip device 9 about the hinge 11. In this zero position the upper surface 9a and lower surface 9b of the wing tip device 9 form a substantially zero angle with the upper surface 7a and lower surface 7b of the fixed wing 7 such that the overall span of the wing 5 is at a maximum. A schematic representation of the actuation system 20 operating in a braked mode is illustrated by FIG. 13a. FIG. 13b illustrates how the clutch and brake are configured to prevent the wing tip device 9 rotating about the hinge 11.

Figure 14:
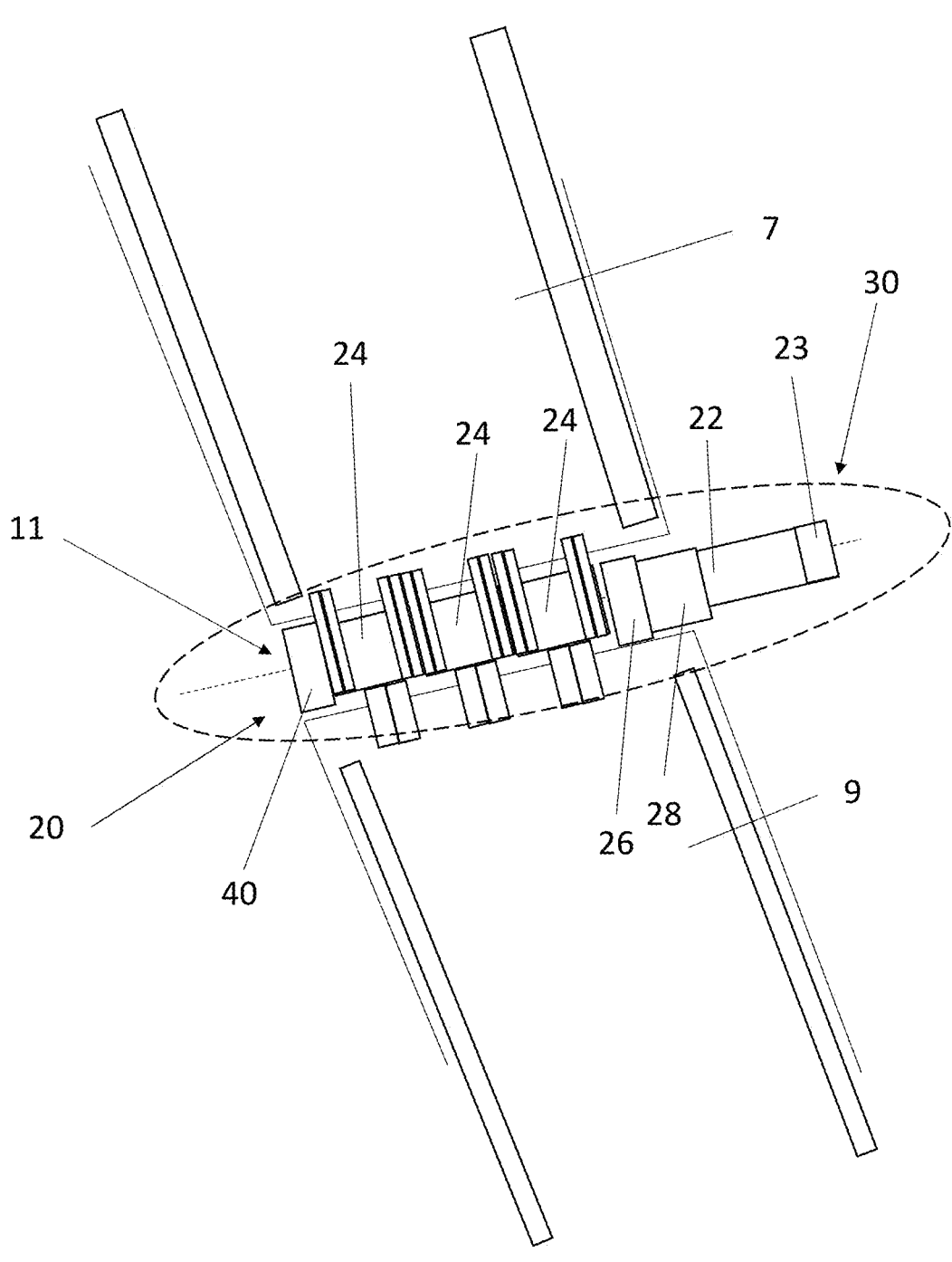
FIG. 14 shows schematically a fifth example of an actuation system for moving the wing tip device in accordance with the invention.

The actuation system 20 may further be operable in a fixed mode in which the clutch 28 is engaged and the brake 23 is disengaged such that the motor 22 may drive rotation of the wing tip device 9 about the hinge 11. A schematic representation of the actuation system 20 operating in a fixed mode is illustrated by FIG. 14a, the dashed line indicating a non-zero target position of the wing tip device 9, and the curved arrow indicating the direction in which the motor 22 is driving the wing tip device 9 to achieve the target position. FIG. 14b illustrates how the clutch and brake are configured to allow the motor 22 to drive the wing tip device 9.

The actuation system 20 may be operable in any combination of the above-described operation modes and may change between modes of operation during flight.

Figure 15:
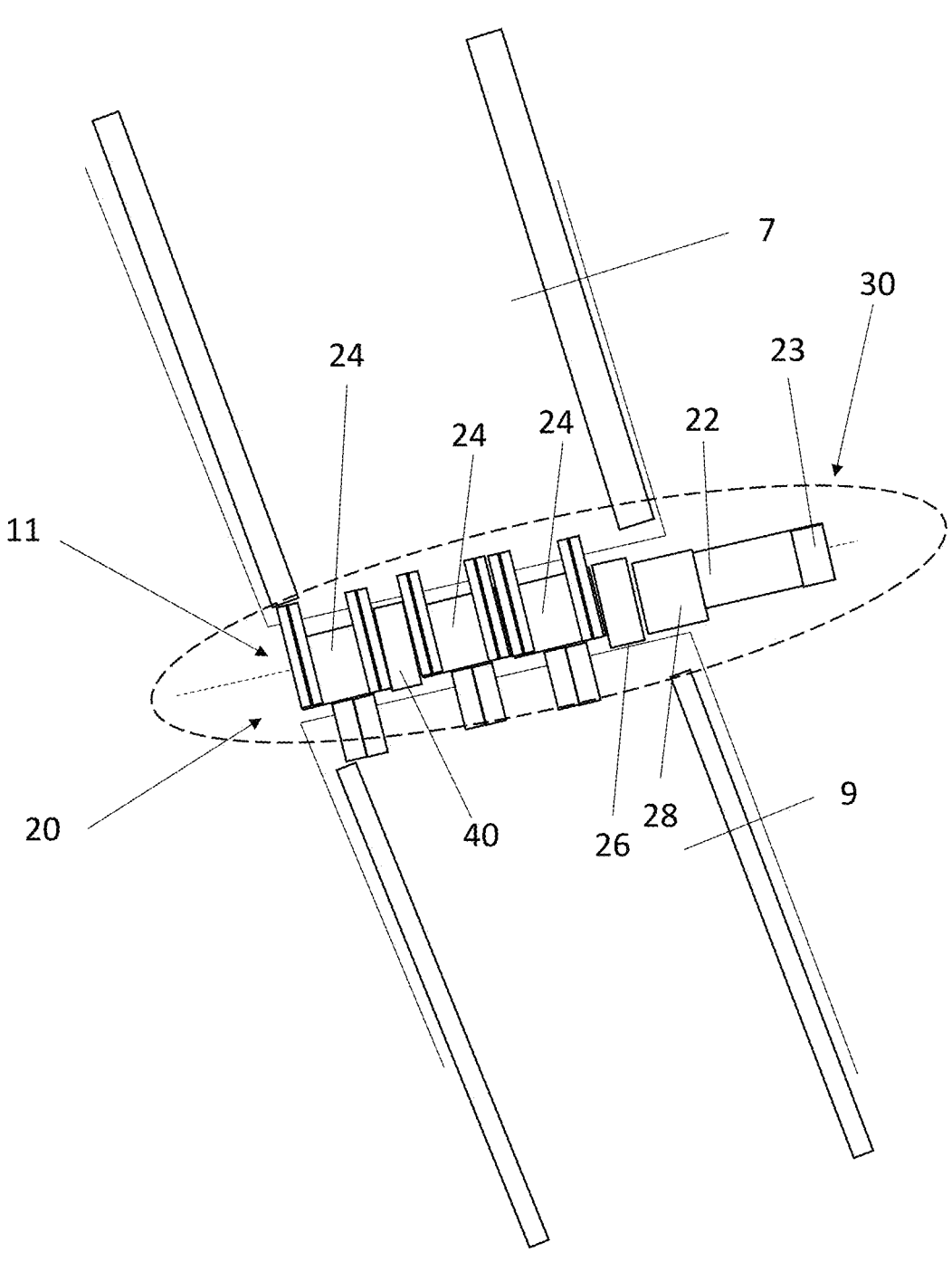
FIG. 15 shows schematically a sixth example of an actuation system for moving the wing tip device in accordance with the invention.

In the above-mentioned examples, the mass 40 is disposed between the geared rotary actuators 24 and the clutch 28. Alternatively, the mass 40 may be disposed forward of the geared rotary actuators 24 towards the leading edge of the wing 5, such as shown in FIG. 15, such that the mass 40 is closer to the leading edge of the wing 5 than the geared rotary actuators 24. Positioning of the mass 40 forward of the geared rotary actuators 24 can be beneficial for packaging the actuation system 20 within the fairing 30. Furthermore, in any of the above examples, the mass 40 may have a diameter substantially the same as the diameter of the geared rotary actuators 24, gearbox 26, and other components of the actuation system 20 in order to retain compact packaging within the fairing 30.

Figure 16A:
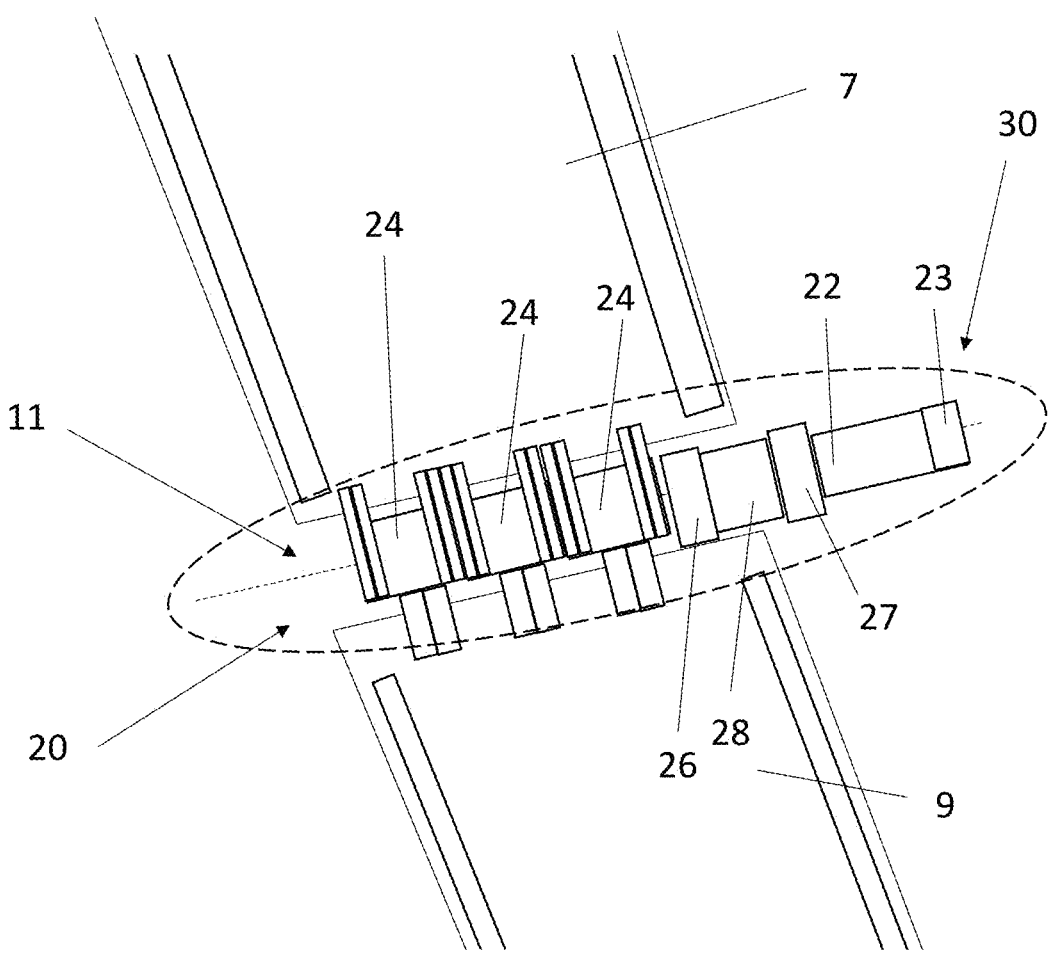
FIG. 16a shows schematically a seventh example of an actuation system for moving the wing tip device in accordance with the invention.
Figure 16B:
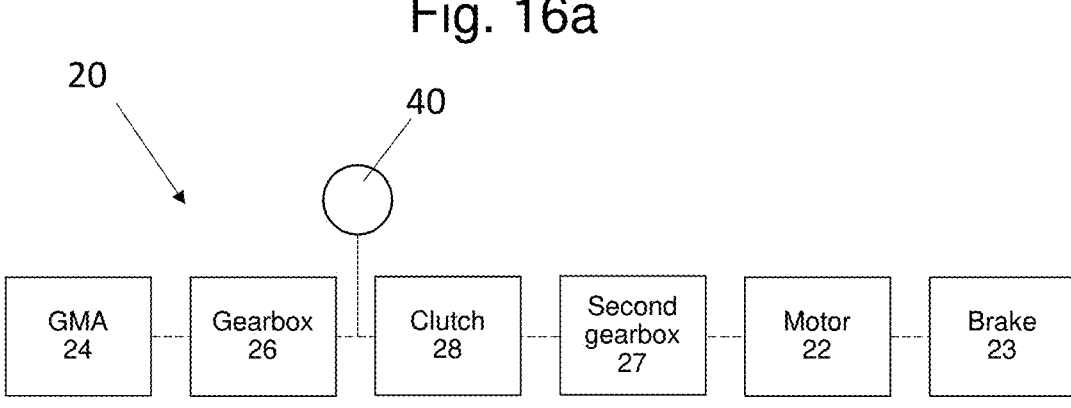
FIG. 16b shows the actuation system of FIG. 16a more generally in block diagram form.

In some examples, the mass 40 may be positioned between a pair of geared rotary actuators 24, such as shown in FIG. 16.

Figure 17A:
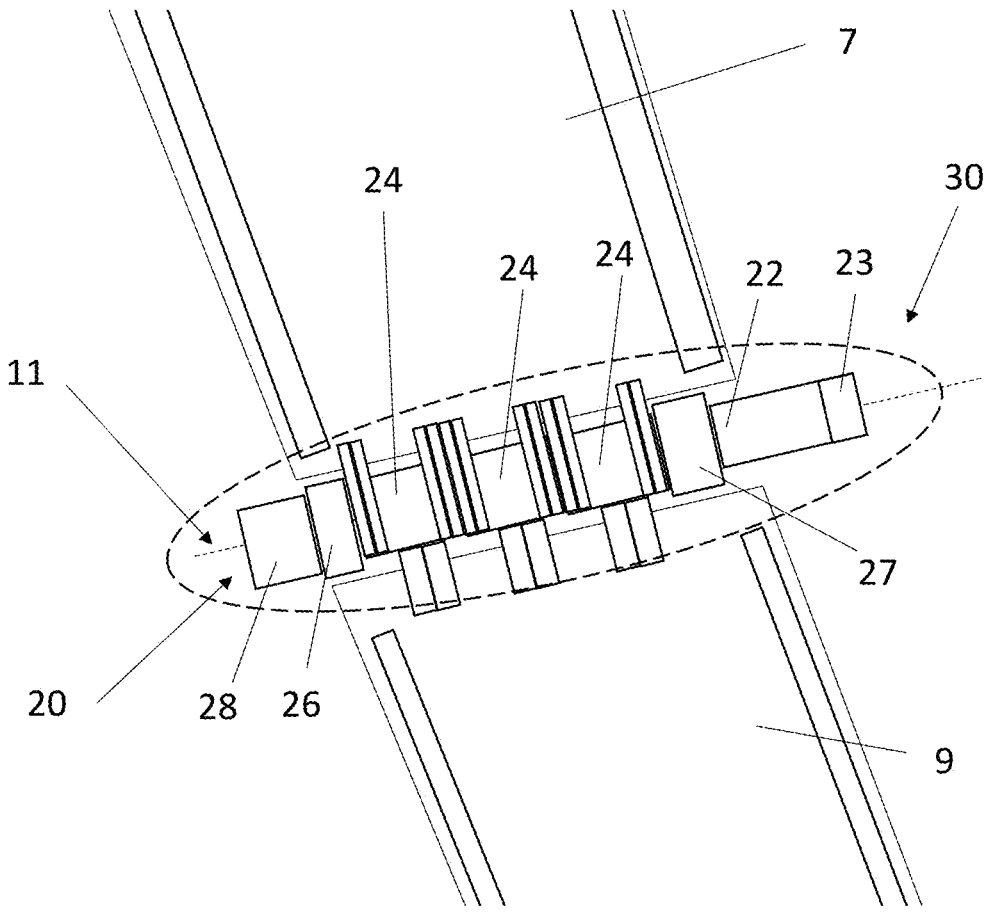
FIG. 17a shows schematically an eighth example of an actuation system for moving the wing tip device in accordance with the invention.
Figure 17B:
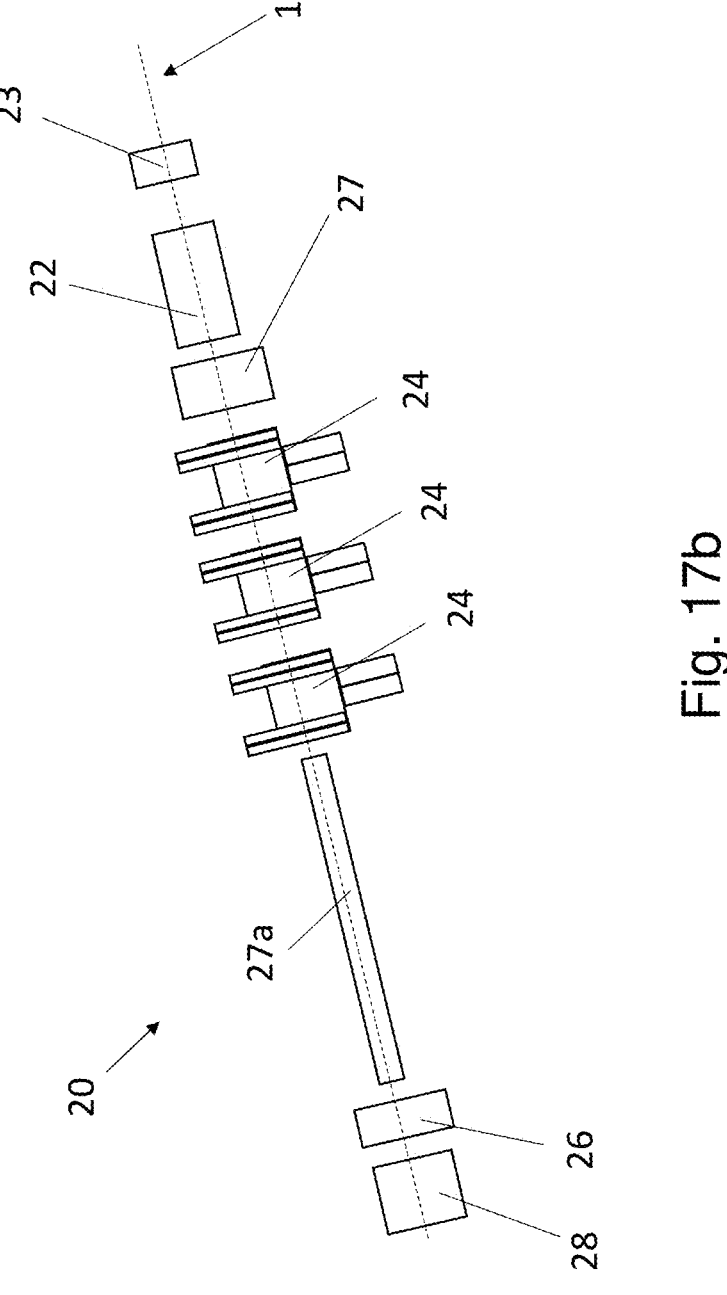
FIG. 17b shows the actuation system of FIG. 18a more generally in block diagram form.

FIG. 17a shows a further embodiment (combinable with any of the previous disclosures) wherein the actuator mechanism 20 comprises a second gearbox 27, the second gearbox 27 arranged between the clutch 28 and the motor 22. Providing a gearbox 26 and a second gearbox 27 allows torque from the motor 22 to be increased in two stages, first by the second gearbox 27 before it is transferred through the clutch 28 to be again increased by the gearbox 26. As such the gear ratio and hence size of each of the gearbox 26 and second gearbox 27 may be made smaller than were a single gearbox 26 used as shown in previous examples. This may be beneficial in reducing the overall size of the actuation system 20 and hence the size of any fairing 30 arranged thereabout. Further, this may allow the reduction ratio of the gearbox 26 to be selected based on the desired damping characteristics of the hinge joint when back-driven, whilst still providing adequate torque to drive the wing tip device 9 using the second gearbox 27. FIG. 17b shows this arrangement more generally in a block diagram.

The actuator mechanism 20 may alternatively be configured as illustrated in FIG. 18a, with the motor 22 arranged on the opposite side of the geared rotary actuators 24 to the clutch 28 and gearbox 26. This arrangement may position the clutch 28 and gearbox 26 ahead of the leading edge of the wing 5 as shown in FIG. 18a, which may be beneficial for example for packaging components within the fairing 30. Although shown to include a second gearbox 27, this configuration may also be applied to actuation systems comprising a single gearbox 26 only. An example of an actuation system 20 configured as such is shown in exploded view in FIG. 18b. In this example, a drive shaft 27a connected to the second gearbox 27 transfers a torque to the clutch 28 but does not act on the geared rotary actuators 24. Once engaged, the clutch 28 transfers torque to the gearbox 26 which in turn drives the geared rotary actuators 24, for example using the common shaft 26a as illustrated in FIG. 4c on which a mass 40 is fixed (not shown in FIG. 18b).

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing comprising a fixed wing with a tip, and a wing tip device rotatably mounted on a hinge at the tip of the fixed wing, such that the wing tip device is rotatable about the hinge, and an actuation system for rotating the wing tip device about the hinge, wherein the actuation system comprises a motor, at least one geared rotary actuator, a clutch for selectively decoupling rotation of the motor from rotation of the geared rotary actuator, the geared rotary actuator is driveable by the motor and arranged to convert rotary motion into a different rotary motion and is arranged to rotate the wing tip device relative to the tip of the fixed wing, wherein the clutch is coupled to the geared rotary actuator by a shaft and the shaft is fixed in rotation to a mass disposed radially outwardly from and on the shaft.

2. The aircraft wing according to claim 1, wherein the hinge has a hinge line and the shaft has a shaft axis of rotation which is coaxial with the hinge line.

3. The aircraft wing according to claim 2, wherein the geared rotary actuator is arranged along a hinge line of the hinge and has an outer diameter, the shaft has a shaft diameter significantly less than the outer diameter of the geared rotary actuator, and the mass has an outer diameter about the shaft axis which is substantially the same as the outer diameter of the geared rotary actuator.

4. The aircraft wing according to claim 1, wherein the mass rotates as the wing tip device rotates about the hinge.

5. The aircraft wing according to claim 4, wherein the mass rotates at an angular velocity faster than the wing tip device rotation about the hinge due to the gearing of the geared rotary actuator.

6. An aircraft wing comprising a fixed wing with a tip, and a wing tip device rotatably mounted on a hinge at the tip of the fixed wing, such that the wing tip device is rotatable about the hinge, and an actuation system for rotating the wing tip device about the hinge, wherein the actuation system comprises a motor, at least one geared rotary actuator, a clutch for selectively decoupling rotation of the motor from rotation of the geared rotary actuator, the geared rotary actuator is driveable by the motor and arranged to convert rotary motion into a different rotary motion and is arranged to rotate the wing tip device relative to the tip of the fixed wing, wherein the clutch is coupled to the geared rotary actuator by a shaft and the shaft is fixed in rotation to a mass disposed radially outwardly from the shaft, wherein the mass is an annulus or a wheel or a ring.

7. An aircraft wing comprising a fixed wing with a tip, and a wing tip device rotatably mounted on a hinge at the tip of the fixed wing, such that the wing tip device is rotatable about the hinge, and an actuation system for rotating the wing tip device about the hinge, wherein the actuation system comprises a motor, at least one geared rotary actuator, a clutch for selectively decoupling rotation of the motor from rotation of the geared rotary actuator, the geared rotary actuator is driveable by the motor and arranged to convert rotary motion into a different rotary motion and is arranged to rotate the wing tip device relative to the tip of the fixed wing, wherein the clutch is coupled to the geared rotary actuator by a shaft and the shaft is fixed in rotation to a mass disposed radially outwardly from the shaft, wherein the shaft extends through a hole in the mass.

8. The aircraft wing according to claim 1, wherein the mass is less than approximately 20% of a mass of the wing tip device.

9. The aircraft wing according to claim 1, wherein the mass is less than approximately 10% of a mass of the combined wing tip device and actuation system.

10. The aircraft wing according to claim 1, further comprising a plurality of the geared rotary actuators arranged along a hinge line of the hinge.

11. The aircraft wing according to claim 1, wherein the mass is disposed forward of the geared rotary actuator towards a leading edge of the wing.

12. The aircraft wing according to claim 1, wherein the mass is disposed between the geared rotary actuators and the clutch.

13. The aircraft wing according to claim 10, wherein the mass is disposed between a pair of the geared rotary actuators.

14. The aircraft wing according to claim 1, wherein the actuation system has a maximum damping value which allows oscillating flapping movement of the wing tip device rotating about the hinge during normal operation when the clutch is disengaged.

15. The aircraft wing according to claim 1, wherein the actuation system is back driveable when the clutch is disengaged to decouple rotation of the motor from rotation of the geared rotary actuator as the wing tip device rotates about the hinge.

16. The aircraft wing according to claim 1, wherein the actuation system further comprises a reduction gearbox.

17. The aircraft wing according to claim 16, wherein the reduction gearbox is disposed between the clutch and the geared rotary actuator along a drive train between the motor and the geared rotary actuator.

18. The aircraft wing according to claim 1, wherein the actuation system further comprises a brake for preventing motion of the geared rotary actuator when the clutch is engaged.

19. The aircraft wing according to claim 18, wherein the actuation system is operable in i) a driving mode in which the clutch is engaged and the motor is driven to rotate the wing tip device about the hinge; ii) a flapping mode in which the clutch is disengaged and the wing tip device is rotatable about the hinge by forces external to the wing tip device; and iii) a braked mode in which the clutch is engaged and the brake prevents rotation of the wing tip device about the hinge.

20. The aircraft wing according to claim 1, wherein the geared rotary actuator has a first knuckle fixed to the fixed wing, and a second knuckle fixed to the wing tip device, wherein the first knuckle and the second knuckle are driven to rotate with respect to each other by the geared rotary actuator using motive force provided by the motor.

* * * * *